(No Model.) 4 Sheets—Sheet 1.
J. N. REIMERS & W. M. SCHNEEKLOTH.
CORN HARVESTER.
No. 470,598. Patented Mar. 8, 1892.
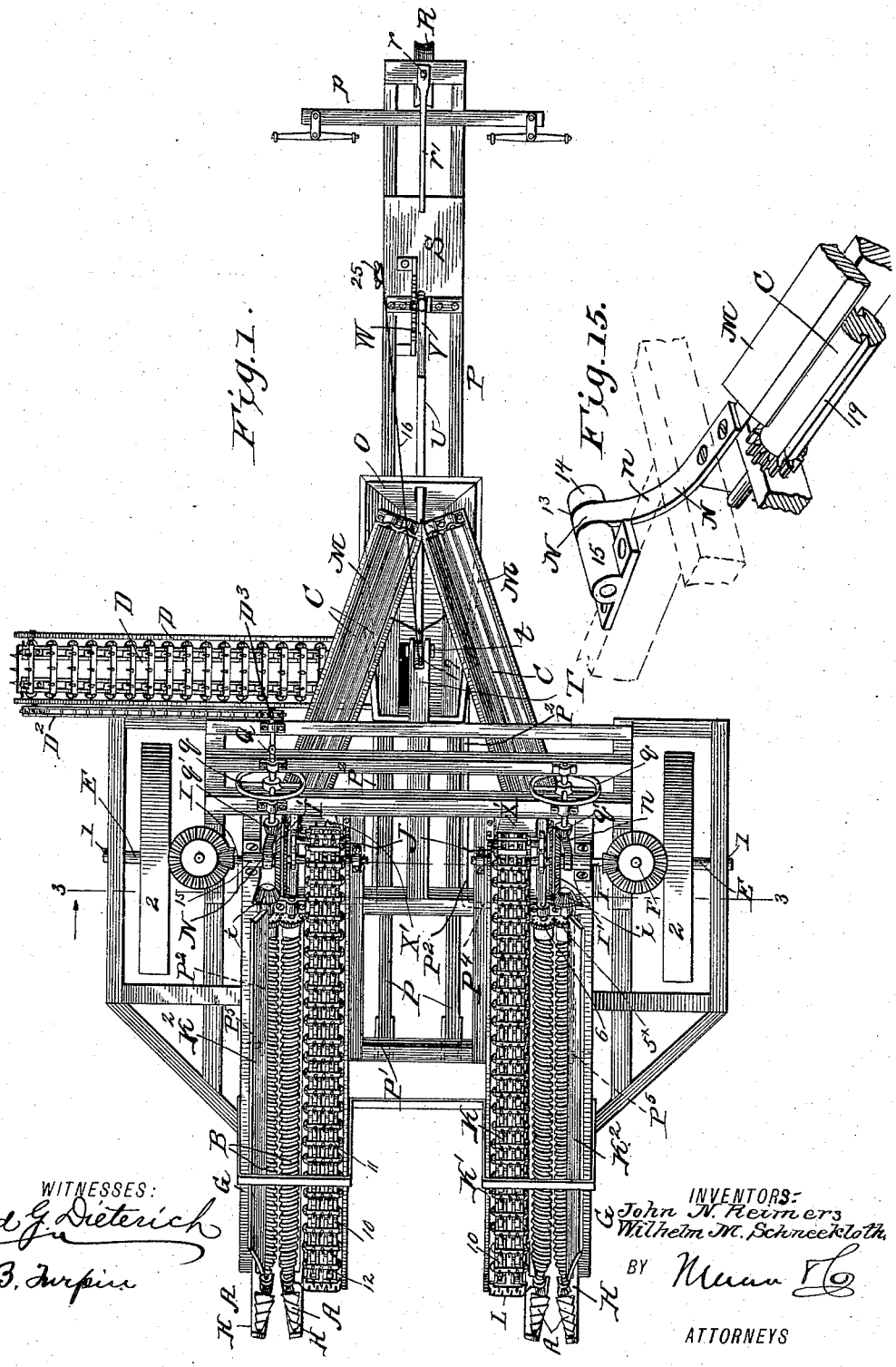

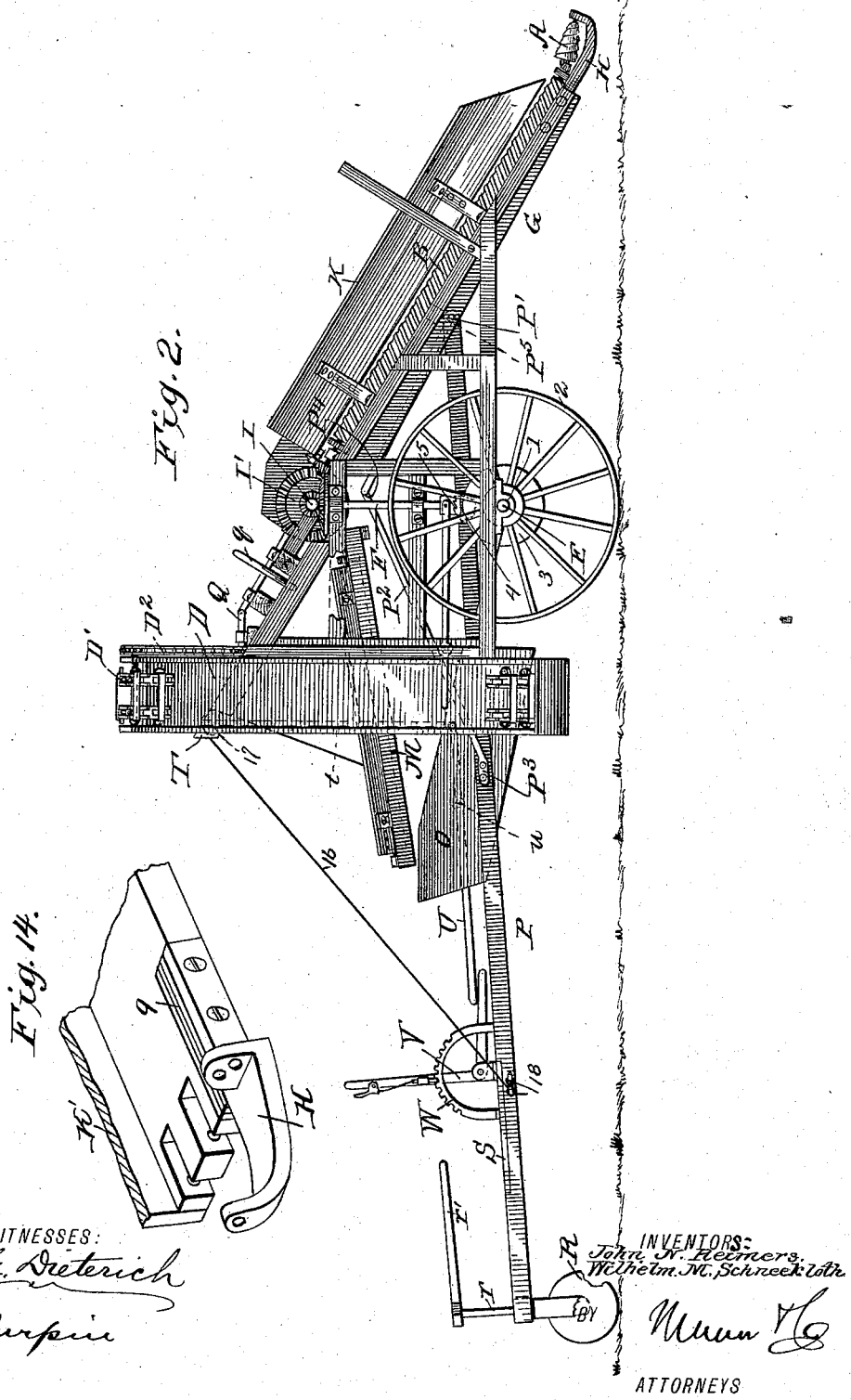

(No Model.) 4 Sheets—Sheet 3.
J. N. REIMERS & W. M. SCHNEEKLOTH.
CORN HARVESTER.
No. 470,598. Patented Mar. 8, 1892.
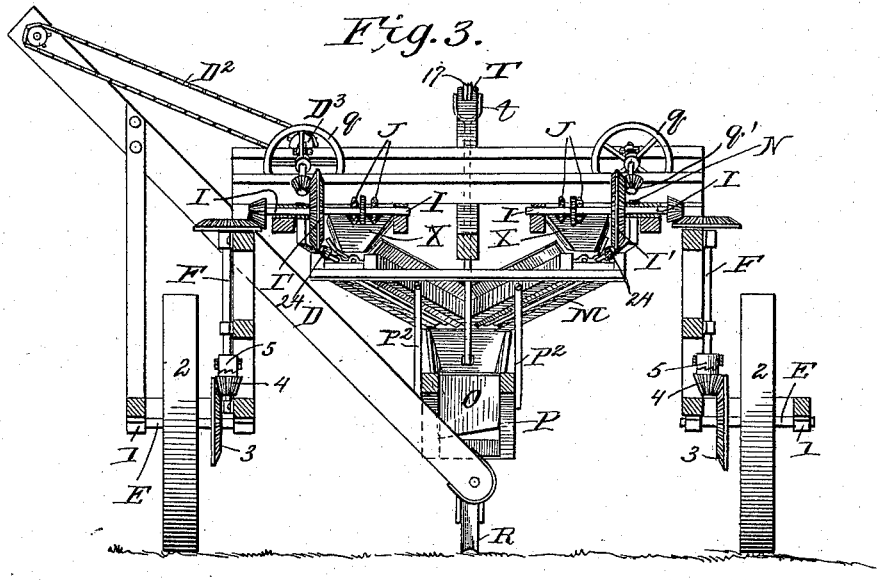
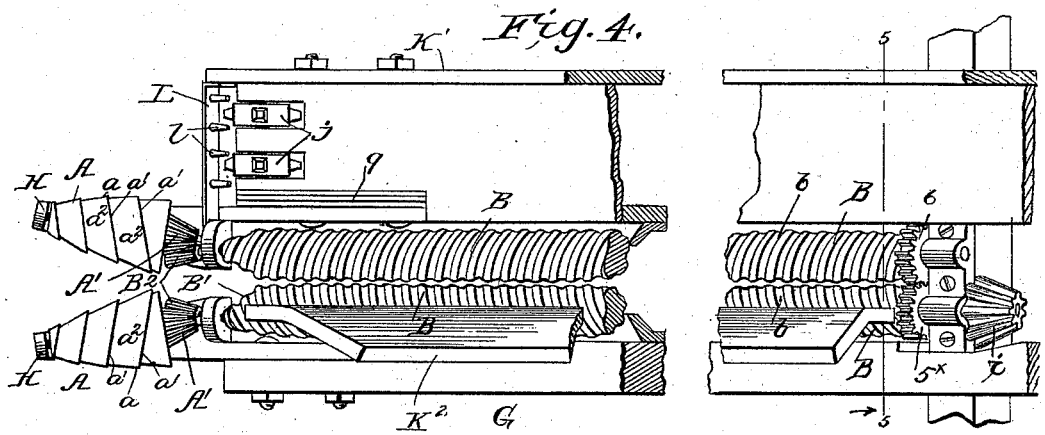
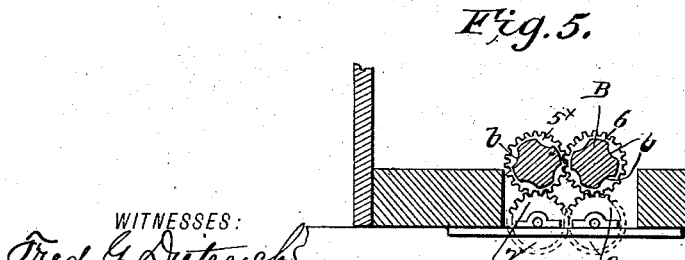
WITNESSES:
Fred G. Dieterich
P. B. Turpin
INVENTORS:
John N. Reimers.
Wilhelm M. Schneekloth
BY Munn & Co.
ATTORNEYS (No Model.) 4 Sheets—Sheet 4.
J. N. REIMERS & W. M. SCHNEEKLOTH.
CORN HARVESTER.
No. 470,598. Patented Mar. 8, 1892.
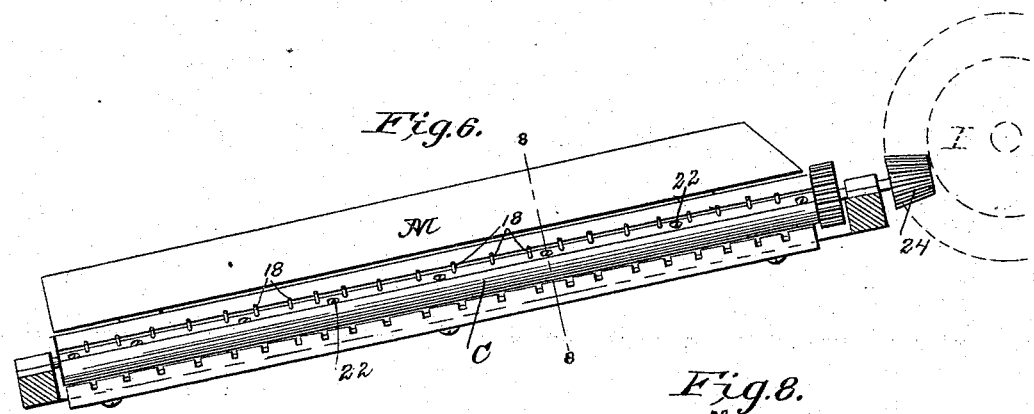
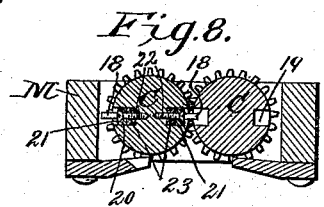
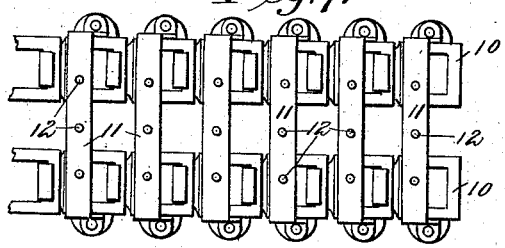
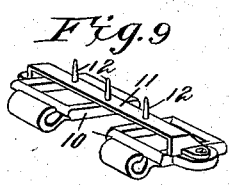
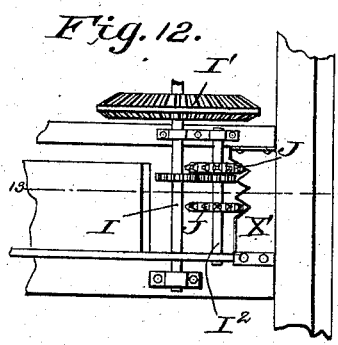
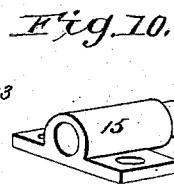
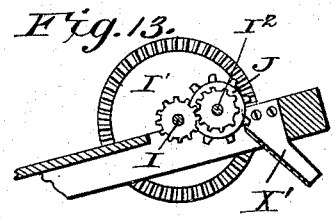
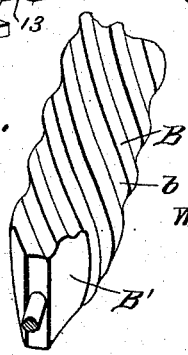
WITNESSES:
Fred G. Dieterich
P. B. Turpin
INVENTORS:
John N. Reimers
Wilhelm M. Schneekloth
BY Munn & Co
ATTORNEYS

UNITED STATES PATENT OFFICE.

JOHN N. REIMERS AND WILHELM M. SCHNEEKLOTH, OF CALUMET, IOWA.

CORN-HARVESTER.

SPECIFICATION forming part of Letters Patent No. 470,598, dated March 8, 1892.

Application filed February 9, 1891. Serial No. 380,838. (No model.)

*To all whom it may concern:*

Be it known that we, JOHN N. REIMERS and WILHELM M. SCHNEEKLOTH, of Calumet, in the county of O'Brien and State of Iowa, have invented a new and useful Improvement in Corn-Harvesters, of which the following is a specification.

This invention is an improved corn-harvesting machine; and it consists in certain novel constructions and combinations of parts, as will be hereinafter described, and pointed out in the claims.

In the drawings, Figure 1 is a top plan view of our machine. Fig. 2 is a side elevation thereof. Fig. 3 is a cross-sectional view on about line 3 3 of Fig. 1. Fig. 4 is a detail view of the infeed and gathering rolls. Fig. 5 is a cross-sectional view on about line 5 5 of Fig. 4. Fig. 6 is a detail view of one of the husking-rolls and supporting-framing. Fig. 7 is a detail view of a part of the carrier. Fig. 8 is a cross-section on about line 8 8 of Fig. 6. Figs. 9 and 10 are detail views. Fig. 11 shows the front end of one of the gathering-rolls, and Figs. 12 and 13 are detail views of the drive-gearing for the gathering-rolls. Fig. 14 is a detail view of one of the shoes, showing, also, some of the parts connected therewith; and Fig. 15 is a detail view showing the joint of the husking-trough with the main frame.

The machine, as shown, comprises the infeed-rolls A, the gathering-rolls B for removing the ears from the stalks, the husking-rolls C for removing the husks, and the discharge-elevator D for conveying the ears to the desired point. The framing is suitably designed to support such parts and will be more fully described in what follows.

We provide bearings 1 for the axles E, which axles have the drive-wheels 2 and pinions 3, such pinions 3 being geared with pinions 4 on the vertical shafts F. These pinions 4 are connected with the upright shafts F by means of clutch-sections 5, which may be conveniently adjusted to key the pinion 4 to or render it free upon the shafts F, as may be desired.

The machine as shown is designed for harvesting two rows; but manifestly some of the improvements may be embodied in a machine for harvesting a single row or any suitable number of rows desired without departing from some of the broad features of our invention.

In the construction shown the parts on the opposite side of a longitudinal center line being of the same construction, the description of one will answer for both.

The framing is provided with forwardly-projecting sub-frames G, which support the shoes H at their front ends, which shoes have upright lugs or portions provided with bearings for the grooved or fluted rollers B for removing the ears. A counter-shaft I is arranged adjacent to the upper end of the rollers B and is geared with the upright shaft F, by which it is driven. This counter-shaft I has a master-wheel I', geared with one of the rolls B, and is also geared with a shaft $I^2$, which is provided with suitable drive-sprockets J for the belt K, which runs alongside the rolls B B and is of a special construction, as more fully described hereinafter.

In the construction shown the master-wheel meshes with a pinion $i$ on the shaft of the outer roll B, which shaft also has a pinion $5^\times$, meshing a pinion 6 on the inner roll B; but in order to gear pinions 5 and 6 when the said pinions are adjusted out of mesh we provide the pinions 7 and 8, meshing together and respectively with the pinions 5 and 6, as shown. The rolls B are of a special construction and are geared to turn toward each other on their upper sides. These rolls are provided with a number of spiral grooves $b$, adapted to receive the stalk of corn and to feed such stalk back as the machine moves forward. By arranging the rolls to incline downward toward their front ends the said rolls move along and travel up the cornstalks, leaving the latter standing erect, as before, and as the rolls travel up the stalks they strip therefrom the ears of corn, which pass onto the belt K and will be carried thereby up and delivered to the husking devices presently described.

The rollers B are provided each with four spiral grooves $b$, two or a pair of such grooves terminating at their forward ends in the cut-away portion or guiding-recess B' on one side of the roller and the other two or pair terminating in the other cut-away portion or recess B', the recesses B' being provided in the construction shown by beveling the front ends of the rollers on opposite sides. It will be seen that the grooves b b of the pair merge into the recess one in rear of the other, and the said recess is inclined between the ends of the grooves, so that if two stalks happen in the recess at the same time as when two stalks enter such recess, one slightly behind the other, one will take into the front groove and the other into the back groove, thus preventing two stalks from feeding back in the same groove and avoiding the crushing of the stalks by such feeding. By avoiding the crushing of the stalks and leaving the same standing erect they will remain in such position to furnish feed to the stock, even when a heavy snow covers the ground.

At their front ends the rolls B B journal in bearings in the front shoes H, and one of these shoes, usually the inner one, as shown, may be adjusted laterally to increase or decrease the space between the rolls B and between the front rolls to suit the size of the stalks. This adjustment is preferably effected by providing spacing-plates 9 between the shoe and the framing, so that by removing some of such plates the rolls may be set farther apart, while by adding to such plates 9 the rolls may be set nearer together, as will be readily understood from the drawings. At their upper ends the grooves $b$ run out at the surface of the rolls and the stalks are discharged at such points from the rolls. The infeed-rolls A journal in the shoes H and are made in the conical form shown with the point or apex to the front. These rolls A are geared to turn away from each other at their upper sides and are formed with spiral flutes $a$, having their rear sides formed to provide practically a square shoulder $a'$ and having their front sides $a^2$ inclined upward to the said shoulders $a'$. The square shoulders $a'$ grasp the stalks and feed the same positively to the front ends of the rolls B. The rolls A are driven by means of pinions A' on their shafts or trunnions, meshing pinions $B^2$ on the shafts or trunnions of the rollers B, as clearly shown in the drawings.

The belt K and its supporting-framing and the guard-board K' are arranged on one side of the rollers B, while at the opposite side of such rollers a guard-board $K^2$ is arranged to prevent the ears from passing off at such side and for directing them onto the belt K. At the lower end of the framing G, in front of the belt K, we provide a bottom or shield L, which has finger-like projections $l$, between which the pins or fingers on the belt K move in the operation of the improvement. The belt K runs upon drive-sprockets J at the upper end of the carrier and guide-sprockets $j$ at the lower end of the carrier, and is composed of the side chains 10 10, the bail 11 extending between and secured at its ends to the chains at the outer sides thereof and provided with upwardly-projected pins 12, which catch the ears of corn as they drop from the rolls and carry them up and deliver them to the upper ends of the husking-rolls. The husking-rolls C are arranged in the bottoms of troughs M, which converge toward and are united at their lower ends, forming practically a V-shaped frame pivoted at the upper end at N. This pivot is effected in the construction shown by providing the troughs at their upper ends with pivot-straps $n$, which fit in grooves 13 in tubular extensions 14 of the bearings 15 for the counter-shafts I. By pivoting the husking-frames at their upper ends and providing means for raising and lowering the opposite end they may be adjusted to any desired angle, whether the machine be ascending or descending a grade, to insure the correct angle for the proper operation of the husking-rolls. In adjusting the husking devices a cord or rope 16 connects therewith and extends up over a guide-pulley 17, supported on a part of the main frame and thence into convenient reach of the driver's platform, where it may be secured by a cleat 25 or in other suitable manner. The rolls C form the bottom of the troughs and move close together, one of the rolls of each pair being provided with a longitudinal row of teeth 18 and the other with a groove 19 to receive such teeth. By preference the teeth 18 are supported on a bar or strip 20, which is secured in a groove 21 of one of the rollers C by means of screws 22 and supported by washers 23 on the screws 22 between the bar or strip 20 and the base of the groove 21, so that the strip 20 may be conveniently adjusted to vary the extent of projection of the pins. In the construction shown one of the husking-rollers C is provided with two rows of the pins and the other roller with two grooves to receive them, as is preferred.

To drive the husking-rolls C, we gear together the rolls of each pair and provide one roller of each pair with a pinion 24, meshing with the master-wheel I'.

In operation the corn in the husks is delivered by the carrier K to the upper ends of the rolls C and passes down the same. The pins or teeth on said rolls serve to tear the husks and to cause a strip or strips to project therefrom, which will be caught by and drawn between the rolls C, drawing with it or them the rest of the husk and so pulling the husk off the ear. The ears are delivered at the lower end of the husking devices into a box or bin O, which is supported on the frame P and inclines forward toward its lower end, where it empties into the lower or receiving end of the discharge-elevator D, which elevator inclines upward and is provided with a carrier D', constructed substantially like the carriers of the elevators K and driven by means of a sprocket-belt $D^2$ from a wheel $D^3$. This wheel $D^3$ is on a section of a jointed shaft Q, which is provided with a fly-wheel $q$ and has a pinion $q'$ meshing the master-wheel.

The frame P, to which the force to move the machine is applied, is provided at $p$ with a doubletree or other means for hitching the horses and has at its rear end a wheel R, having the shaft $r$ of its supporting-frame journaled in the frame P and provided with a lever-like handle $r'$, extended in convenient reach from the platform S. At its front end the frame P is pivoted at $P'$ to the main frame, near to and on opposite sides of the center of such frame, and is provided with side braces $P^2$, secured at $P^3$ to the frame P, extending thence forward and upward and then outward at $P^4$, where it passes over the standing corn-stalks, and then curving downward and forward and being pivoted at $P^5$ to the main frame in line with the pivot $P'$ of the frame P. By these side braces the force applied to the frame P to move the machine forward is applied to the outer sides or portions of the main frame, as well as to the center thereof, and enables the movement of the machine with less strain upon the main frame, and also renders it easier to control the direction of movement of the machine.

It will be seen that the main frame practically pivots on the axles E and that it can be tilted on such axles to effect the adjustment of the front or gathering rolls to any suitable height. In effecting this adjustment we provide the main frame with a rearwardly-projected beam or portion T, which is connected by a rod or connection $t$ with the front end of a lever U, which pivots at $u$ to the frame P, and has its rear end arranged adjacent to the driver's platform and for operation by a suitable operating device, which may be a windlass and rope, but is preferably a bell-crank lever V, having one arm engaging the rear end of said lever and its other a handle-arm moving adjacent to a rack-arch W and provided with a pawl for engaging the same, so the lever U may be adjusted to and secured in any desired adjustment. By this combination of levers the desired adjustment of the main frame may be easily effected. The receivers X at the upper ends of the husking-troughs are provided at their front ends with fingers $X'$, between which the pins 12 of the carrier $K'$ pass, such fingers $X'$ serving to lift the ears from the carrier $K'$ and prevent their being carried over the upper end of such carrier.

It will be noticed, particularly from Fig. 1, that the spirals on the rollers B do not extend entirely to the rear end of the rollers, but grow shallower toward their rear ends and merge into the periphery of the rollers, so that the rear ends of the rollers serve to draw the stalks down before they reach the gearing.

Having thus described our invention, what we claim as new is—

1. The herein-described infeed-rolls A, provided with spiral flutes having their front sides inclined upward toward the rear and their rear sides formed to provide square shoulders at approximately right angles to the axis of said rolls, the rolls being geared to revolve toward each other on their under sides, and having their flutes on the said sides inclined to diverge rearwardly whereby to feed the stalks rearwardly without tending to crush the same to the ground, all substantially as shown and described.

2. The combination, substantially as described, of the infeed-rolls having spiral flutes formed with inclined front faces and square rear sides and provided at their rear ends with pinions, the gathering-rolls arranged in rear of said infeed-rolls and provided at their front ends with pinions meshing those of the infeed-rolls, such gathering-rolls being provided with spiral grooves, and mechanism for driving the gathering-rolls, all substantially as set forth.

3. In a corn-harvester, the herein-described gathering-rolls provided at their front ends with recesses and having several spiral grooves, two or more of which merge into each recess, all substantially as and for the purposes set forth.

4. In a corn-harvester, the combination of the main frame, two sets of gathering and elevating devices arranged one at each side of the said main frame, and the husking devices comprising two troughs arranged at their upper ends to receive the ears from said elevating devices and converging toward their lower ends and united, all substantially as and for the purposes set forth.

5. The combination, in a traveling corn harvester and husker, of the main frame or carriage, the gathering devices for stripping the ears from the stalks, the husking devices having troughs pivoted at their upper ends to the main frame, and mechanism by which the opposite ends of such troughs may be adjusted vertically, whereby the angle of inclination of the troughs may be adjusted according to the grade of the ground being traversed by the machine, all substantially as set forth.

6. The combination, in a corn-harvester, of the main frame, the frame P, connected with and extended rearwardly from the main frame, the infeed and gathering devices, the husker comprising two troughs pivoted at their upper ends to the main frame and converging toward their lower ends, and the cord or connection secured to the lower ends of the said troughs, extended thence over a guide 17 on the main frame, and connected with the frame P, substantially as and for the purposes set forth.

7. In a corn-harvester, the combination of the main frame, the infeed and gathering devices, the husker comprising a trough or frame pivoted at its upper end to the main frame and provided with the rolls, adapted to tear the husks from the ears, and mechanism whereby to adjust the angle of the husker, whereby the same may be adjusted to operate properly on different grades, all substantially as and for the purposes set forth.

8. In a corn-harvester, the combination, with the husking frame or trough, of the husking-rolls forming the bottom thereof and provided with grooves, and the bar fitted and capable of radial adjustment in the groove of one of such rollers and provided with projecting pins or teeth arranged to enter the grooves of the other roll when the rolls move in contact, all substantially as and for the purposes set forth.

9. In combination, substantially as described, the infeed-rolls, the gathering-rolls, and the adjustable shoes having bearings, substantially as described, the supporting-framing, and the filling-plates 9, removable and insertible, whereby the shoes and rolls may be adjusted together or apart, substantially as set forth.

10. The herein-described carrier for corn-harvesters, consisting of the independent side chains having their links provided at their outer sides with lateral lugs or ears and the bails extended between said chains and provided at their ends with downwardly-bent arms or portions secured to the lateral lugs of the chain-links, the said bails being provided with upwardly-projected pins or teeth, substantially as set forth.

JOHN N. REIMERS.
WILHELM M. SCHNEEKLOTH.

Witnesses:
C. E. ACHORN,
W. P. DAVIS.